(12) United States Patent
Vega et al.

(10) Patent No.: US 10,433,673 B2
(45) Date of Patent: Oct. 8, 2019

(54) FOOD SERVICE EQUIPMENT COMPRISING A MULTIPLE-PASS FEEDER CONVEYOR AND TOASTER

(71) Applicants: Ignacio Vega, Countryside, IL (US); Bhupendra Patel, Carol Stream, IL (US)

(72) Inventors: Ignacio Vega, Countryside, IL (US); Bhupendra Patel, Carol Stream, IL (US)

(73) Assignee: A. J. ANTUNES & CO., Carol Stream, IL (US)

( * ) Notice: Subject to any disclaimer, the term of this patent is extended or adjusted under 35 U.S.C. 154(b) by 237 days.

(21) Appl. No.: 15/585,615

(22) Filed: May 3, 2017

(65) Prior Publication Data

US 2018/0317710 A1 Nov. 8, 2018

(51) Int. Cl.
  *A47J 37/08* (2006.01)
  *A21B 1/24* (2006.01)
  (Continued)

(52) U.S. Cl.
  CPC ............ *A47J 37/0857* (2013.01); *A21B 1/24* (2013.01); *A21B 1/48* (2013.01); *A47J 37/08* (2013.01); *F24C 15/32* (2013.01); *A47J 37/00* (2013.01)

(58) Field of Classification Search
  CPC ........ A47J 37/0857; A47J 37/044; A21B 1/48
  See application file for complete search history.

(56) References Cited

U.S. PATENT DOCUMENTS 3,478,704 A    11/1969  Ford
3,611,913 A *  10/1971  McGinley ........... A47J 37/0857
                                                            118/13

(Continued)

*Primary Examiner* — Kevin F Murphy
(74) *Attorney, Agent, or Firm* — Law Offices of Steven W. Weinrieb (57) ABSTRACT

Food service equipment comprises a multiple-pass feeder conveyor and toaster which comprises an upper inclined food product infeed conveyor ramp for causing the food products to proceed in a first direction extending from the rear of the appliance toward the front of the appliance and onto the upper run of a first upper endless conveyor. The upper run of the first upper endless conveyor conveys the food products into a semi-circular return product feeder which causes the food products to be conveyed in a second opposite direction extending from the front of the appliance toward the rear of the appliance and into an entry space defined by means of the lower run of the first upper endless conveyor and the upper run of a second lower endless conveyor, the two conveyors being synchronized together. The pair of conveyors convey the food products between heated platens respectively associated with the two conveyors whereby the food products are cooked or toasted. The cooked or toasted food products are discharged onto a lower inclined food product discharge ramp which is disposed substantially parallel to the first inclined food product infeed ramp such that the finished food products are conveyed in a third direction, parallel to the first direction, toward a finished food product platform from which the finished food products may be removed for serving to diners. Additional pairs of conveyors can also be incorporated within the system, in a vertically stacked array, so as to effectively increase the length of travel experienced by the multiple food products without increasing the footprint of the equipment.

16 Claims, 3 Drawing Sheets

(51) Int. Cl.
 *A21B 1/48* (2006.01)
 *F24C 15/32* (2006.01)
 *A47J 37/00* (2006.01)

(56) References Cited

U.S. PATENT DOCUMENTS

| | | | |
|---|---|---|---|
| 3,993,788 | A | 11/1976 | Longenecker |
| 4,560,395 | A | 12/1985 | Davis |
| 4,715,272 | A * | 12/1987 | Mendoza ................. A21B 1/48 99/339 |
| 5,077,072 | A * | 12/1991 | Sieradzki ................. A21B 1/48 426/523 |
| 6,361,578 | B1 | 3/2002 | Rubinson |
| 6,817,283 | B2 * | 11/2004 | Jones ..................... A21B 1/245 99/386 |
| 7,297,903 | B1 * | 11/2007 | March ................. A47J 37/0857 219/388 |
| 8,087,407 | B2 * | 1/2012 | Wiker ..................... A21B 1/40 126/19 R |
| 362,196 | A1 | 12/2015 | Chen et al. |
| 2003/0232103 | A1 * | 12/2003 | Marino ................... A21B 1/48 425/371 |
| 2005/0067256 | A1 * | 3/2005 | Lawrence ................ A21C 9/08 198/599 |
| 2005/0077150 | A1 * | 4/2005 | Dickinson ............. B65G 15/14 198/603 |

* cited by examiner

FOOD SERVICE EQUIPMENT COMPRISING A MULTIPLE-PASS FEEDER CONVEYOR AND TOASTER

FIELD OF THE INVENTION

The present invention relates generally to food service equipment, and more particularly to a new and improved food service equipment for preparing tortillas or similar food products wherein, in lieu of food preparation personnel having to infeed the food products, to be cooked, toasted, or the like, in an individual or one-by-one manner, the food service equipment of the present invention enables multiple food products to be inserted into the food service equipment in an essentially simultaneous manner whereby the multiple food products will be conducted in a first direction, as may be considered to extend from the rear of the appliance toward the front of the appliance, upon the upper run of a first upper endless conveyor belt which is moving in the first direction extending from the rear of the equipment toward the front of the equipment. The upper run of the first upper endless conveyor belt will then feed the multiple food products toward an arcuately configured semi-circular self-return product feeder, which extends transversely across the entire lateral extent of the upper run of the first upper endless conveyor belt, such that the arcuately configured semi-circular self-return product feeder will effectively reverse the direction in which the food products are being conveyed so as to now convey the food products in a second opposite direction, that is, in the direction extending from the front of the equipment toward the rear of the equipment, and into a space or bite defined between the lower run of the first upper endless conveyor belt and the upper run of a second lower endless conveyor belt, wherein the first and second endless conveyor belts comprise synchronized conveyor belts. A first heated platen is disposed above the lower run of the first upper endless conveyor belt, while a second heated platen is disposed beneath the upper run of the second lower endless conveyor belt so as to effectively impart heat to their respectively associated first and second conveyor belts. In this manner, as the food products are conveyed in the second direction and pass through the space or bite defined by the cooperating lower run of the first upper conveyor belt and the upper run of the second lower conveyor belt, the food products will be cooked or toasted as desired. The first and second endless conveyor belts then discharge the cooked or toasted food products onto a horizontally oriented finished food product platform from which food preparation personnel can remove the food products in order that the finished food products can be served to diners. Alternatively, or supplementally, an inclined food product infeed ramp may be operatively associated with the upper run of the first endless conveyor belt so as to feed the multiple food products onto the upper run of the first endless conveyor belt, while still further, an inclined food product discharge ramp may be disposed beneath the second lower endless conveyor belt so as to conduct the cooked and toasted food products onto the finished food product platform. Still yet further, an additional set or sets of endless conveyors may be utilized in conjunction with the aforenoted set of first and second endless conveyors order to extend the operational cycle time by means of which particular food products need to be properly cooked or toasted. All of the sets of endless conveyors are effectively stacked within a vertical array whereby the footprint of the equipment remains small, so as to minimize the workspace required to house the equipment, while simultaneously extending the overall length of the conveyor system as needed.

BACKGROUND OF THE INVENTION

Traditional food service equipment which prepares, cooks, or toasts various different food products such as, for example, tortillas or the like, for various food establishments, usually require food preparation personnel to feed the food products, to be cooked or toasted, individually, or one at a time, into the equipment. Obviously, this is very inefficient and time consuming, particularly for a fast-food type food establishment where quick, rapid, or shortened cooking or preparation times are required in order to produce the cooked or toasted food products within the shortened service times which effectively define one of the more important attractive features or characteristics of fast-food establishments.

A need therefore exists in the art for new and improved food service equipment. An additional need exists in the art for new and improved food service equipment which is adapted to prepare, cook, or toast specific food items. A still additional need exists in the art for new and improved food service equipment which is adapted to prepare, cook, or toast tortillas or similar type food items. A yet additional need exists in the art for new and improved food service equipment which can be utilized in various different food establishments. A still yet additional need exists in the art for new and improved food service equipment which can be utilized in various different food establishments, such as, for example, fast food restaurants. A further need exists in the art for new and improved food service equipment which can be utilized in various different food establishments, such as, for example, fast food restaurants wherein quick turnaround time for cooking or preparing food item orders is a highly sought-after feature or characteristic. A still further need exists in the art for new and improved food service equipment which can be utilized in various different food establishments, such as, for example, fast food restaurants wherein the equipment is very compact yet efficient in providing the cooked food products. A yet further need exists in the art for new and improved food service equipment which can be utilized in various different food establishments, such as, for example, fast food restaurants wherein the appliance is very compact, efficient in providing the cooked food products, and can be operated by means of a minimum number of food preparation personnel. A still yet further need exists in the art for new and improved food service equipment which can be utilized in various different food establishments, such as, for example, fast food restaurants wherein the equipment is very compact, efficient in providing the cooked food products, can be easily operated by means of a minimum number of food preparation personnel, and can be utilized to prepare, cook, or toast numerous food items substantially simultaneously as opposed to being constrained to process the food items singly, or in a one-by-one fashion.

Overall Objectives of the Present Invention

An overall objective of the present invention is to provide new and improved food service equipment. An additional overall objective of the present invention is to provide new and improved food service equipment which is adapted to prepare, cook, or toast specific food items. A still additional overall objective of the present invention is to provide new and improved food service equipment which is adapted to prepare, cook, or toast tortillas or similar type food items. A yet additional overall objective of the present invention is to provide new and improved food service equipment which can be utilized in various different food establishments. A still yet additional overall objective of the present invention is to provide new and improved food service equipment which can be utilized in various different food establishments, such as, for example, fast food restaurants. A further overall objective of the present invention is to provide new and improved food service equipment which can be utilized in various different food establishments, such as, for example, fast food restaurants, wherein quick turnaround time for cooking or preparing food item orders is a highly sought-after feature or characteristic. A still further overall objective of the present invention is to provide new and improved food service equipment which can be utilized in various different food establishments, such as, for example, fast food restaurants wherein the equipment is very compact yet efficient in providing the cooked food products. A yet further overall objective of the present invention is to provide new and improved food service equipment which can be utilized in various different food establishments, such as, for example, fast food restaurants wherein the appliance is very compact, efficient in providing the cooked food products, and can be operated by means of a minimum, number of food preparation personnel. A still yet further need exists in the art for new and improved food service equipment which can be utilized in various different food establishments, such as, for example, fast food restaurants wherein the equipment is very compact, efficient in providing the cooked food products, can be easily operated by means of a minimum number of food preparation personnel, and can be utilized to prepare, cook, or toast numerous food items substantially simultaneously as opposed to being constrained to process the food items singly, or in a one-by-one fashion.

SUMMARY OF THE INVENTION

The foregoing and other objectives are achieved in accordance with the teachings and principles of the present invention through the provision of new and improved food service equipment for preparing tortillas or similar food products wherein, in lieu of food preparation personnel having to infeed the food products, to be cooked, toasted, or the like, in an individual or one-by-one manner, the food service equipment of the present invention enables multiple food products to be inserted into the food service equipment in an essentially simultaneous manner whereby the multiple food products will be conducted in a first direction, as may be considered to extend from the rear of the appliance toward the front of the appliance, upon the upper run of a first upper endless conveyor belt which is moving in the first direction extending from the rear of the equipment toward the front of the equipment. The upper run of the first upper endless conveyor belt will then feed the multiple food products toward an arcuately configured semi-circular self-return product feeder, which extends transversely across the entire lateral extent of the upper run of the first upper endless conveyor belt, such that the arcuately configured semi-circular self-return product feeder will effectively reverse the direction in which the food products are being conveyed so as to now convey the food products in a second opposite direction, that is, in the direction extending from the front of the equipment toward the rear of the equipment, and into a space or bite defined between the lower run of the first upper endless conveyor belt and the upper run of a second lower endless conveyor belt, wherein the first and second endless conveyor belts comprise synchronized conveyor belts.

A first heated platen is disposed above the lower run of the first upper endless conveyor belt, while a second heated platen is disposed beneath the upper run of the second lower endless conveyor belt so as to effectively impart heat to their respectively associated first and second conveyor belts. In this manner, as the food products are conveyed in the second direction and pass through the space or bite defined by the cooperating lower run of the first upper conveyor belt and the upper run of the second lower conveyor belt, the food products will be cooked or toasted as desired. The first and second endless conveyor belts then discharge the cooked or toasted food products onto a horizontally oriented finished food product platform from which food preparation personnel can remove the food products in order that the finished food products can be served to diners. Alternatively, or supplementally, an inclined food product infeed ramp may be operatively associated with the upper run of the first endless conveyor belt so as to feed the multiple food products onto the upper run of the first endless conveyor belt, while still further, an inclined food product discharge ramp may be disposed beneath the second lower endless conveyor belt so as to conduct the cooked and toasted food products onto the finished food product platform. Still yet further, an additional set or sets of endless conveyors may be utilized in conjunction with the aforenoted set of first and second endless conveyors order to extend the operational cycle time by means of which particular food products need to be properly cooked or toasted. All of the sets of endless conveyors are effectively stacked within a vertical array whereby the footprint of the equipment re-mains small, so as to minimize the workspace required to house the equipment, while simultaneously extending the overall length of the conveyor system as needed.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
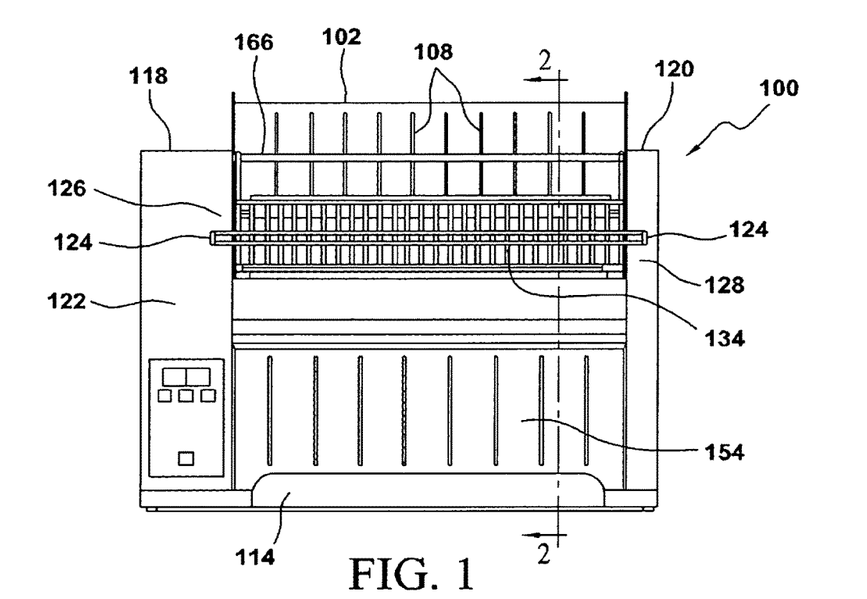
FIG. 1 is a front elevational view of a first embodiment of new and improved food service equipment which has been constructed in accordance with the principles and teachings of the present invention and which shows the corresponding parts thereof.
Figure 2:
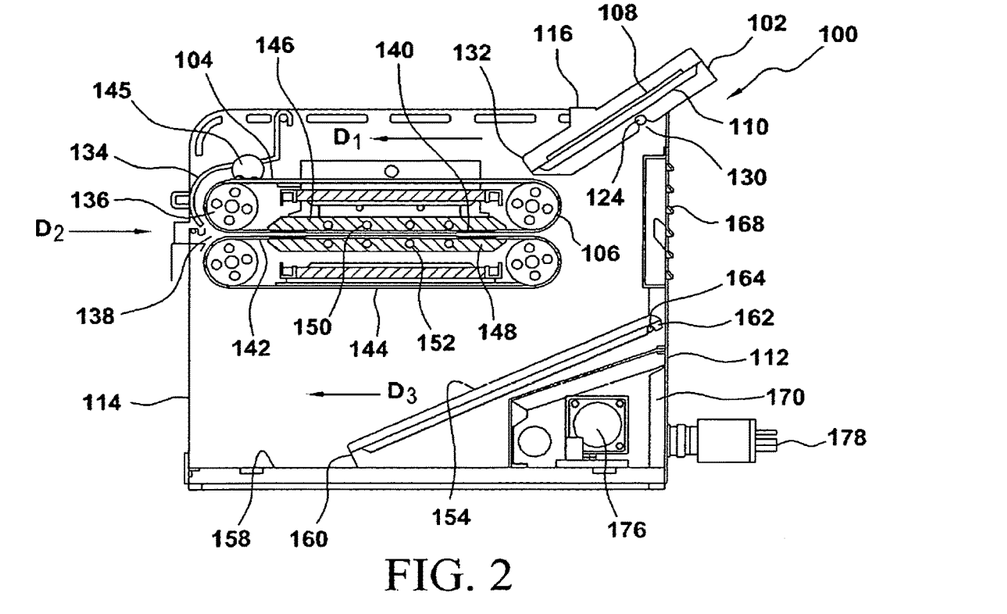
FIG. 2 is a cross-sectional view of the new and improved food service equipment as illustrated within FIG. 1 and as viewed along the section line 2-2 in FIG. 1 so as to illustrate the various operative components of the food service equipment more clearly.
Figure 3:
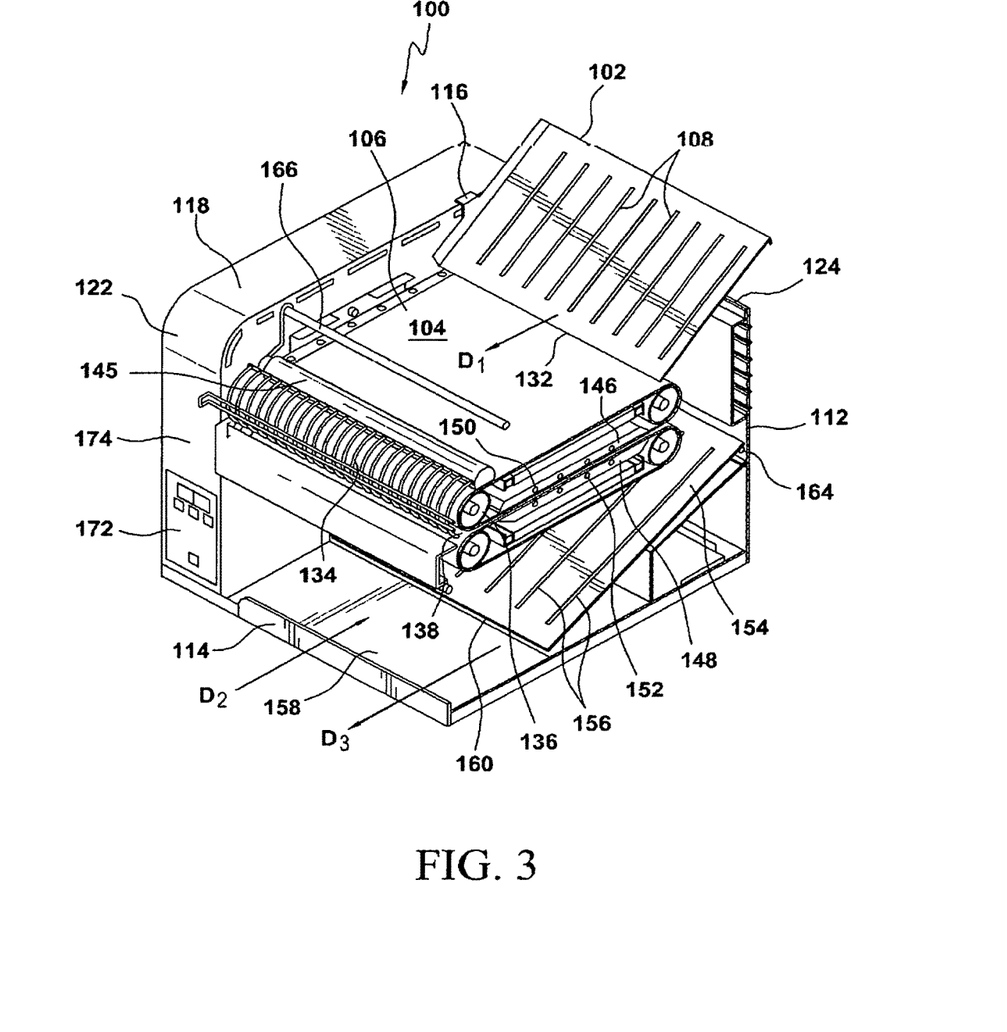
FIG. 3 is a front/side perspective view of the new and improved food service equipment as illustrated within FIGS. 1 and 2 and illustrates the various component parts of the food service equipment from a perspective which is different from that which can be obtained from FIGS. 1 and 2.

Referring now to the drawings, and more particularly to FIGS. 1-3 thereof, a first embodiment of new and improved food service equipment is disclosed and is generally indicated by the reference character 100. More particularly, the new and improved food service equipment 100 has been developed for preparing or cooking or toasting tortillas or similar food products wherein, in lieu of food preparation personnel having to infeed the food products, to be cooked, toasted, or the like, in an individual or one-by-one manner, the food service equipment 100 of the present invention enables multiple food products to be inserted into the food service equipment 100 in an essentially simultaneous manner. More specifically, and as can best be seen or appreciated from FIG. 3, the new and improved food service equipment 100 is seen to comprise an upper food product infeed ramp 102 which is oriented at an angle of approximately 45° with respect to the upper run 104 of a first horizontally oriented endless conveyor belt 106, as can best be seen or appreciated from FIG. 2. The upper food product infeed ramp 102 has a plurality of elongated glide members or rails 108 which, again, as can best be seen or appreciated from FIG. 2, comprise a plurality of elongated bars which are respectively disposed within a plurality of elongated slots 110 defined within the upper food product infeed ramp 102, and are disposed parallel to one another, such that the plurality of elongated glide members or rails 108 project outwardly from the plurality of elongated slots 110 and above the upper surface portion of the upper food product infeed ramp 102.

In this manner, when multiple food products are placed upon the upper food product infeed ramp 102, they will be conducted or conveyed downwardly as a result of effectively sliding or gliding upon or along the plurality of elongated glide members or rails 108 of the food product infeed ramp 102 so as to be deposited onto the upper run 104 of the first horizontally oriented endless conveyor belt 106. As can also be best seen or appreciated from FIGS. 2 and 3, opposite side edge portions 116 of the upper food product infeed ramp 102 are respectively provided with support tabs 116, only one of which is visible in FIGS. 2 and 3, which are adapted to rest upon or be affixed to oppositely disposed upper surface portions 118, 120 of the equipment housing 122, and a first horizontally oriented support rod 124, which extends transversely across the equipment 100 so as to be fixedly connected within oppositely disposed side wall portions 126, 128, as can best be seen in FIG. 1, of the equipment housing 122, is disposed beneath the food product infeed ramp 102 such that the first horizontally oriented support rod 124 can be accommodated within a horizontally oriented, transversely extending slotted portion 130 formed within the undersurface portion of the upper food product infeed ramp 102. In this manner, the upper food product infeed ramp 102 is properly supported in its inclined position upon the equipment 100.

Continuing further, and as can best be appreciated from FIGS. 2 and 3, the lower end portion 132 of the upper food product infeed ramp 102 terminates immediately adjacent to and just above the upper run 104 of the first upper endless conveyor belt 106 which is moving in a first direction $D_1$ extending from the rear end portion 112 of the equipment 100 toward the front end portion 114 of the equipment 100. The upper run 104 of the first upper endless conveyor belt 106 will then feed the multiple food products toward an arcuately configured substantially semi-circular self-return product feeder 134 which extends transversely across the entire lateral extent of the upper run 104 of the first upper endless conveyor belt 106 so as to effectively partially surround the left drive roller 136 of the first upper conveyor belt 106. The arcuately configured, substantially semi-circular self-return product feeder 134 will thus effectively reverse the direction in which the food products are being conveyed so as to now convey the food products in a second opposite direction $D_2$, that is, in the direction extending from the front end portion 114 of the equipment 100 toward the rear end portion 112 of the equipment 100, and into a space or bite 138 defined between the lower run 140 of the first upper endless conveyor belt 106 and the upper run 142 of a second lower endless conveyor belt 144, wherein the first and second endless conveyor belts 106, 144 comprise synchronized conveyor belts. It is also to be noted that a food product drive roller 145 is disposed above the terminal end portion of the upper run 104 of the first upper endless conveyor 106 so as to operatively cooperate with the upper run 104 of the first upper endless conveyor 106 in effectively securing the food products upon the upper run 104 of the first upper endless conveyor 106 as the conveyed food products are about to encounter the arcuately configured, substantially semi-circular self-return product feeder 134. The food product drive roller 145 may be a vertically movable roller mechanism wherein the end portions of the same, not shown, are disposed within vertically oriented slots, not shown, defined within the side wall portions 126, 128 of the equipment housing 122 such that the food product drive roller 145 may move upwardly under the biasing force of a food product when the food product pass beneath the same and will move downwardly back toward its disposition in engagement with the upper run 104 of the first upper endless conveyor 10 under gravitational forces.

A first heated platen 146 is disposed above the lower run 140 of the first upper endless conveyor belt 106, while a second heated platen 148 is disposed beneath the upper run 142 of the second lower endless conveyor belt 144 so as to effectively impart heat to their respectively associated first and second conveyor belts 106, 144. Suitable heating coils or rods 150, 152 are incorporated within the first and second heated platens 146, 148 as can best be seen in FIGS. 2 and 3. In this manner, as the food products are conveyed in the second direction $D_2$ and pass through the space or bite 138 defined between the cooperating lower run 140 of the first upper conveyor belt 106 and the upper run 142 of the second lower conveyor belt 144, the food products will be cooked or toasted as desired. The first and second endless conveyor belts 106, 144 will then discharge the cooked or toasted food products onto an inclined food product discharge ramp 154 which is disposed beneath the second lower endless conveyor belt 144 and which is disposed substantially parallel to the inclined food product infeed ramp 102. Accordingly, the cooked or toasted food products will effectively be conducted or conveyed in a third reversed direction $D_3$ which extends from the rear end portion 112 of the food service equipment 100 toward the front end portion 114 of the food service equipment 100 or, in other words, in a direction which is substantially parallel to the first direction $D_1$ along which the uncooked food items were initially conveyed. It is noted that the inclined food product discharge ramp 154, in a manner similar to the food product infeed ramp 108, contains a plurality of elongated glide members or rails 156 so as to facilitate the sliding or gliding conveying movement of the finished food products downwardly along the inclined food product discharge ramp 154 and onto a horizontally oriented finished food product platform 158 from which food preparation personnel can remove the food products in order that the finished food products can be served to diners. In a manner similar to the fixation or disposition of the inclined food product infeed ramp 108 within the upper region of the equipment 100, it is noted that the lower end portion of the inclined food product discharge ramp 154 is provided with a lip member 160 which is adapted to rest upon or be affixed to the finished food product platform 158, while the upper rear end portion of the second inclined food product discharge ramp 154 is provided with a hooked portion 162, as can best be seen in FIG. 2, which is adapted to be secured around a horizontally oriented, transversely extending support rod 164 which is similar to support rod 124 utilized in conjunction with the upper inclined food product infeed ramp 102.

Lastly, it is noted, as can best be seen in FIG. 3, that a horizontally oriented connecting rod 166 extends transversely across the front end portion of the equipment 100 at an elevation above the upper run 104 of the first upper endless conveyor belt 106, wherein the oppositely disposed end portions of the connecting rod 166 are fixedly secured within the side wall portions 118, 120 of the equipment housing 122. In addition, a plurality of louvers 168 are fixedly mounted within the upper region of a rear wall member 170 of the equipment housing 122 so as to provide exhaust air ventilation for the interior of the equipment 100 whereby heat emitted from the heated platens 146, 148 and the first and second upper and lower endless conveyor belts 106, 144 can be exhausted from the interior portion of the equipment housing 122 to atmosphere. Still yet further, it is also noted that a user interface 172 is provided upon a left front face portion 174 of the equipment housing 122. The user interface 172 can comprise various different operative controls for operating the equipment 100 such as, for example, the speed of the synchronized upper and lower endless conveyor belts 106, 144, the temperature level of the upper and lower heated platens 146, 148, and ON and OFF power switch, and the like. A drive motor 176 is illustrated for driving the first and second endless conveyors 106, 144, and a power source 178 is illustrated for providing power to the drive motor 176.

Figure 4:
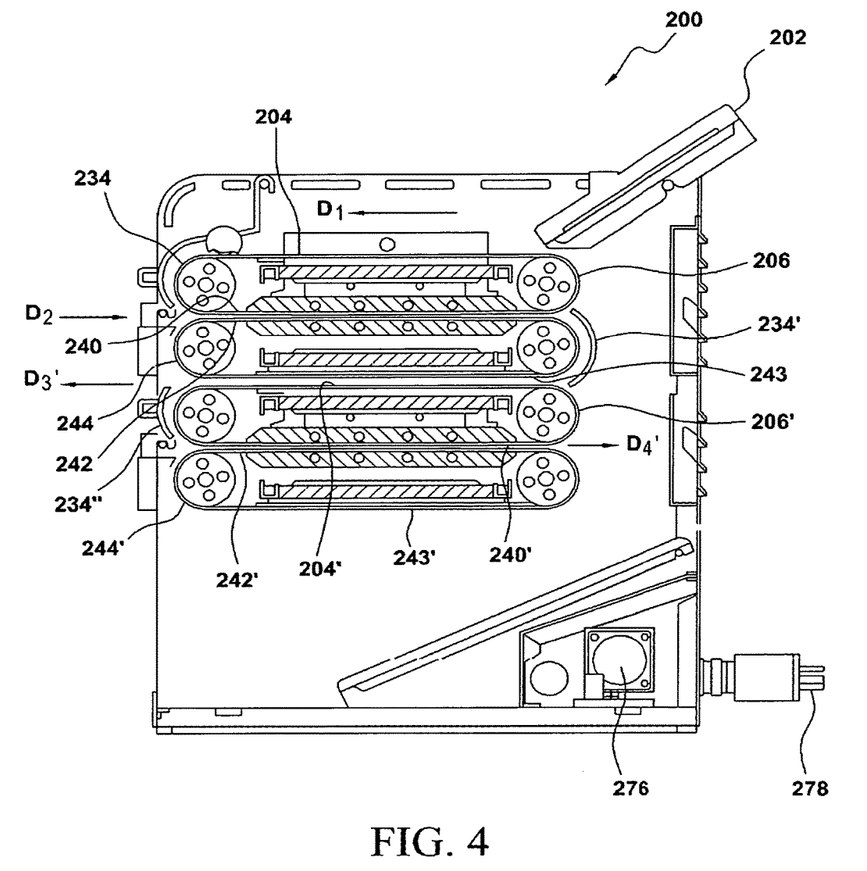
FIG. 4 is a cross-sectional view, similar to that of FIG. 2, showing, however, a second embodiment of the equipment of the present invention wherein multiple sets of endless conveyors can be arranged within a vertically stacked array such that food products to be cooked can be conveyed along an extended conveyor system while maintaining the footprint of the equipment the same as that of the first embodiment as illustrated within FIGS. 1-3.

Referring now to FIG. 4, a second embodiment of new and improved service equipment is disclosed and is generally indicated by the reference character 200. It is to be noted that component parts of the second embodiment food service equipment which correspond to component parts of the first embodiment food service equipment 100 will be provided with corresponding reference numbers except that they will be in the 200 series. More particularly, the significant difference between the first embodiment food service equipment 100 and the second embodiment food service equipment 200 resides in the number of sets of synchronized conveyor belts. More particularly, in some food establishments, and in connection with the cooking or toasting of different food products, the food products need to be exposed to the heat from the heated platens for a greater period of cooking or toasting time than can be achieved by means of the passage of the food products between the lower run of the first upper endless conveyor belt 106 and the upper run of the second lower endless conveyor belt 144. One might immediately believe that the lengths of the endless conveyors 106, 144 simply need to be extended, however, increasing the length of the conveyors 106, 144 requires additional floor space, or additional countertop space, because longer conveyors occupy a larger footprint of floor space. Therefore, in accordance with the principles and teachings of the second embodiment of the present invention, the food service equipment 200 comprises a first upper set of upper and lower endless conveyor belts 206, 244, and a second lower set of upper and lower endless conveyor belts 206', 244' wherein, as can be readily seen from FIG. 4, the sets of endless conveyor belts are effectively stacked atop each other in a vertical array. In this manner, the effective footprint of the second embodiment food service equipment 200 remains the same as that of the first embodiment food service equipment 100, and yet the effective length of the conveyor is effectively tripled as a result of the food products passing between the lower run 240 of the first upper endless conveyor 206 and the upper run 242 of the first lower endless conveyor 244 in the direction $D_2$ which extends from the front of the equipment 200 to the rear of the equipment 200, the food products subsequently passing between the lower run 243 of the first lower endless conveyor 244 and the upper run 204' of the second lower endless conveyor 206 in the direction $D_3'$ which extends from the rear of the equipment 200 to the front of the equipment 200, and lastly as a result of the food products passing between the lower run 240' of the second upper endless conveyor belt 206' and the upper run 242' in the direction $D_4'$ which extends from the front of the equipment 200 to the rear of the equipment 200. Of course, appropriate semi-circular self-return product feeders 234, 234', and 234", similar to semi-circular self-return product feeder 134, are provided in connection with the various conveyors so as to smoothly and efficiently convey the food products between the different upper and lower runs of the conveyors. It is noted still further that in accordance with the principles and teachings of the present invention, even more additional sets of endless conveyors can be incorporated within the food service equipment than as illustrated either in accordance with the first embodiment food service equipment 100 or the second food service equipment 200.

Obviously, many variations and modifications of the present invention are possible in light of the above teachings. It is therefore to be understood that within the scope of the appended claims, the present invention may be practiced otherwise than as specifically described herein.

NUMBER KEY REFERENCE

100—Equipment
102—First inclined food product infeed conveyor
104—Upper run of first endless conveyor 106
106—First endless conveyor
108—Glide rails defined within first inclined food product infeed conveyor
110—Slots defined within first inclined product infeed conveyor for accommodating glide rails 108
112—Rear end portion of equipment 100
114—Front end portion of equipment 100
116—Tabs connecting first inclined food product infeed conveyor 102 to side wall portions 118, 120 of equipment 100
118, 120—Side wall portions of equipment 100
122—Equipment housing
124—Support rod for first inclined food product infeed conveyor 102
126, 128—Oppositely disposed side walls of housing 122
130—Slot defined within undersurface of first inclined food product infeed conveyor 102 for accommodating rod 124
132—Lower end edge portion of first inclined food product infeed conveyor 102

134—Self-return product feeder
136—Left drive roller of first upper endless conveyor 106
138—Space or bite defined between the upper and lower endless conveyors 106, 144
140—Lower run of first endless conveyor 106
142—Upper run of second endless conveyor 144
144—Second endless conveyor
145—Product drive roller operatively associated with upper run 142 of endless conveyor 106
146—First upper platen associated with lower run 140 of endless conveyor 106
148—Second lower platen associated with upper run 142 of endless conveyor 144
150—Heating coil/rods disposed within first upper platen 146
152—Heating coil/rods disposed within second lower plate 148
154—Second inclined food product discharge conveyor
156—Rails within second inclined food product discharge conveyor 154
158—Platform for finished food products
160—Lower edge portion of second inclined food product discharge conveyor 154
162—Fastening hook of second inclined food product discharge conveyor 154 for accommodating support rod 164
164—Support rod for second inclined food product discharge conveyor 154
166—Horizontally oriented transversely extending connecting rod of equipment 100
168—Ventilation louvers mounted in rear wall 170 of equipment housing 122
170—Rear wall of equipment housing 122
172—User interface
174—Front wall of housing 122
176—Drive motor for the upper and lower endless conveyors 106, 144
178—Power source for drive motor 176
200—Second embodiment new food service equipment
204—Upper run of first upper endless conveyor 206
206—First upper endless conveyor of first set of endless conveyors
206'—Second upper endless conveyor of second set of endless conveyors
234—Self-return product feeder
234'—Self-return product feeder
234"—Self-return product feeder
240—Lower run of first upper endless conveyor 206
240'—Lower run of second upper endless conveyor 206'
242—Upper run of first lower endless conveyor 244
242'—Upper run of second lower endless conveyor 244'
243—Lower run of first lower endless conveyor 244
243'—Lower run of second lower endless conveyor 244'
244—First lower endless conveyor of first set of endless conveyors
244'—Second lower endless conveyor of second set of endless conveyors

What is claimed as new and desired to be protected by Letters Patent, is:

1. Food service equipment for conveying multiple food products to be cooked or toasted along a multiple-pass/multiple directional conveying system, comprising:
   a first endless belt conveyor for conveying multiple food products along a first conveyor path extending in a first direction of travel from a first end of said first endless belt conveyor to a second end of said first endless belt conveyor;
   a second endless belt conveyor synchronized with said first endless belt conveyor in such a manner that an upper run portion of said second endless belt conveyor operatively cooperates with a lower run portion of said first endless belt conveyor whereby together said first and second endless belt conveyors, simultaneously and in conjunction with each other, convey the multiple products along a second conveyor path extending in a second direction which is opposite to said first direction and which extends from said second, end of said first endless belt conveyor and a first end of said second endless belt conveyor to a second end of said second endless belt conveyor; and
   a pair of heated platens respectively associated with said lower run portion of said first endless belt conveyor and said upper run portion of said second endless belt conveyor for imparting heat to said lower run portion of said first endless belt conveyor and said upper run portion of said second endless belt conveyor such that the multiple food products, being conveyed in said second direction by said pair of synchronized conveyors, are cooked, toasted, and discharged from said second end of said second endless conveyor.

2. The equipment as set forth in claim 1, further comprising:
   a self-return product feeder operatively associated with said first and second endless conveyors for reversing the direction of conveyance of the multiple food products, as the multiple food products travel in said first direction along said upper run of said first endless conveyor, and for conducting the multiple food products toward said first and second endless conveyors such that the multiple food products can be conveyed by said first and second endless conveyors in said second direction.

3. The equipment as set forth in claim 2, further comprising:
   a drive product roller operatively associated with said upper run of said first endless conveyor so as to operatively cooperate with said upper run of said first endless conveyor in conveying the multiple food products toward and into said self-return product feeder.

4. The equipment as set forth in claim 1, further comprising:
   a horizontally oriented platform for receiving the cooked and toasted food products when discharged from said second endless conveyor.

5. The equipment as set forth in claim 1, further comprising:
   a food product infeed conveyor ramp upon which the multiple food products are deposited and for conveying the multiple food products onto said first endless conveyor.

6. The equipment as set forth in claim 5, wherein:
   said food product infeed conveyor comprises a fixed inclined conveyor ramp.

7. The equipment as set forth in claim 6, wherein:
   said inclined food product infeed conveyor ramp is inclined at an angle of approximately 45° with respect to the horizontal.

8. The equipment as set forth in claim 6, wherein:
   said inclined food product infeed conveyor ramp has a plurality of glide rails, fixedly mounted within said inclined food product infeed conveyor and which are disposed parallel to one another, so as to facilitate the gliding conveying of the multiple food products along said inclined food product infeed conveyor ramp toward said first endless conveyor.

9. The equipment as set forth in claim 1, further comprising:
a food product discharge conveyor ramp for receiving the multiple cooked and toasted food products from said second end of said second endless conveyor for conveying the multiple food products in said first direction.

10. The equipment as set forth in claim 9, wherein:
said food product discharge conveyor ramp comprises a fixed inclined conveyor ramp.

11. The equipment as set forth in claim 10, wherein:
said inclined food product discharge conveyor ramp is inclined at an angle of approximately 45° with respect to the horizontal.

12. The equipment as set forth in claim 10, wherein:
said inclined food product discharge conveyor ramp has a plurality of glide rails, fixedly mounted therein and which are disposed parallel to each other, so as to facilitate the gliding conveying of the multiple food products along said inclined food product discharge conveyor ramp.

13. The equipment as set forth in claim 1, further comprising:
a housing; and
a user interface incorporated upon said housing for enabling personnel to input commands in order to control operative parameters of said equipment which are selected from the group comprising the speed of said pair of synchronized conveyors, the temperature of said heated platens, an ON power switch, and an OFF power switch.

14. The equipment as set forth in claim 13, further comprising:
ventilation louvers mounted upon said housing so as to permit heat from interior portions of said housing, as generated by said heated platens, to escape to atmosphere.

15. The equipment as set forth in claim 1, further comprising:
at least one additional conveyor operatively associated with said first and second endless conveyors whereby the effective conveyor length, along which the multiple food products travel, is at least tripled with respect to said first conveyor path.

16. The equipment as set forth in claim 15, wherein:
said at least one additional conveyor and said first and second endless conveyors are disposed within a vertically stacked array such that said effective conveyor length, along which the multiple food products travel, is at least tripled without increasing the footprint of the equipment.

* * * * *